(12) United States Patent
Liao

(10) Patent No.: US 7,116,663 B2
(45) Date of Patent: Oct. 3, 2006

(54) MULTI-FIELD CLASSIFICATION USING ENHANCED MASKED MATCHING

(75) Inventor: Heng Liao, Burnaby (CA)

(73) Assignee: PMC-Sierra Ltd., Burnaby (CA)

( * ) Notice: Subject to any disclaimer, the term of this patent is extended or adjusted under 35 U.S.C. 154(b) by 1077 days.

(21) Appl. No.: 09/908,917

(22) Filed: Jul. 20, 2001

(65) Prior Publication Data
US 2003/0108043 A1 Jun. 12, 2003

(51) Int. Cl.
*H04L 12/28* (2006.01)
*H04L 12/56* (2006.01)
*G06F 7/00* (2006.01)

(52) U.S. Cl. ............. 370/392; 708/210; 708/211; 708/212; 707/3

(58) Field of Classification Search ........... 707/3–6; 708/210–212; 710/49–51; 370/389, 392; 340/146.2
See application file for complete search history.

(56) References Cited

U.S. PATENT DOCUMENTS 5,951,651 A * 9/1999 Lakshman et al. .......... 709/239
5,956,721 A 9/1999 Douceur et al.
5,995,971 A 11/1999 Douceur et al.
6,499,081 B1 * 12/2002 Nataraj et al. ............ 711/108
6,697,911 B1 * 2/2004 Srinivasan et al. ........ 711/108

OTHER PUBLICATIONS

Packet Classification on Multiple fields, Computer Systems Laboratory, Stanford University, pp. 147-160, Pankaj Gupta et al.
"High-Speed Policy-based Packet Forwarding Using Efficient Multi-dimensional Range Matching" Laksshman, pp. 203-214.
"Fast and Scalable Layer Four switching", pp. 191-202, Srinivasan et al.
"Classifying Packets with Hierarchical Intelligent Cuttings" Stanford University, pp. 34-41, Gupta et al.

* cited by examiner

Primary Examiner—Hassan Kizou
Assistant Examiner—Habte S. Mered
(74) Attorney, Agent, or Firm—Chris B. Behmann; Borden Ladner Gervais LLP

(57) ABSTRACT

Methods and apparatus for finding a match between a target bit pattern and multiple filter bit patterns. A filter array is created from the filter bit patterns and at least one intermediate array is generated from the filter array. Specific columns of the intermediate arrays are then extracted based on bit values of the target bit pattern. A row by row AND operation is performed on these columns to arrive at a match vector. the match vector identifies which of the filter bit patterns in the filter array match the target bit pattern. The method is implemented by using multiple classifier elements operating in parallel with each classifier element handling multiple filter bit patterns.

20 Claims, 8 Drawing Sheets

MULTI-FIELD CLASSIFICATION USING ENHANCED MASKED MATCHING

FIELD OF THE INVENTION

The present invention relates to bit pattern matching. More specifically, the present invention relates to processes and devices for matching a target bit pattern with multiple filter bit patterns.

BACKGROUND OF THE INVENTION

In data networks, routers classify packets to determine the micro-flows the packets belong to and then apply the classification to the packets accordingly. Flow identification is the essential first step for providing any flow dependent service. A number of network services require packet classification including access-control, firewalls, policy-based routing, provision of integrated/differentiated qualities of service, traffic billing, secure tunnelling. In each application, the classifier determines which micro-flow an arriving packet belongs to so as to determine whether to forward or filter, where to forward it to, what class of service it should receive, the scheduling tag/state/parameter that it is associated with, or how much should be charged for transporting it. The classifier maintains a set of rules about packet headers for flow classification.

To clarify, a router is multi-port network device that can receive and transmit data packets from/to each port simultaneously. Data packets typically has regular format with uniform header structure. The header structure usually contain data fields such as address, packet type. When a packet is received from a port, the router uses the header information to determine whether a packet is discarded, logged, or forwarded. If a packet is forwarded, then the router also calculates which output port the packet will be going to. The router also accounts for the number of each type of packet passing by. The forwarding decision (where to send the packet) is typically made based on the destination address carried in the packet. In an Internet Protocol Router, forwarding involves a lookup process called the Longest Prefix Match (LPM) that is a special case of the general mask matching process.

The LPM uses a route table that maps a prefix rule (a mask-matching rule with all the wildcard bits located at the contiguous least significant bits) to an output port ID. An example of an LPM route table is given below:

| # | 32-bit Prefix | Output PortID |
|---|---|---|
| 1 | xxxx xxxx xxxx xxxx xxxx xxxx xxxx xxxx | port 0 |
| 2 | 1111 0010 1100 xxxx xxxx xxxx xxxx xxxx | port 1 |
| 3 | 1101 0011 0001 xxxx xxxx xxxx xxxx xxxx | port 3 |
| 4 | 1111 0010 1100 1100 0011 xxxx xxxx xxxx | port 2 |
| 5 | 0010 0000 0001 1111 1111 0000 1101 0000 | port 4 |

An input packet with destination address="1111 0010 1100 1100 0011 1111 1111 1111" should be forwarded to port 2 because it matches entry #3 and #4, but #4 has priority over #3 because the prefix length (number of non-wildcard bits) of #4 is longer than #3.

The router/firewalls examine the input packets to determine if they should be discarded and logged. This is usually done with an Access Control List (ACL) Lookup. An ACL can be a suer configurable mask-matching rule set (based on packet header fields) that categorizes certain types of traffic that may be hazardous to the network. Hence, when a packet that matches an ACL entry, the router/firewall should take action according to the ACL to discard/log the packet or alarm the network administrator.

Such devices as explained above use general multi-layer classification methods in carrying out the devices function. General multi-layer classification requires the examination of arbitrary data/control fields in multiple protocol layers. The grammatical/lexical parser provides flexible solutions to this problem, but the cost of supporting a large rule set is high.

A multiple field classifier is a simple form of classifier that relies on a number of fixed fields in a packet header. A classic example is the 7-dimensional classification, which examines the SA/DA/TOS/Protocol in the IP header, and the SPORT/DPORT/PROTOCOL_FLAG in the TCP/UDP header. Because a multi-field classifier deals with fixed fields, parsing is not required. Instead of dealing with variable length packets, the multi-field classifier does classification on fixed sized search keys. The search key is a data structure of the extracted packet data fields. The Multi-field classifier assumes the search keys are extracted from the packet before being presented to the classifier.

The problem of multiple field classification can be transformed into the problem of condition matching in multi-dimensional search key space, where each dimension represents one of the data fields the classifier needs to examine. A classification rule specifies conditions to be matched in all dimensions.

The classification rules specify value requirements on several fixed common data fields. Previous study shows that a majority of existing applications require up to 8 fields to be specified: source/destination Network-layer address (32-bit for Ipv4), source/destination Transport-layer port numbers (16-bit for TCP and UDP), Type-of-service (TOS) field (8-bits), Protocol field (8-bits), and Transport-Layer protocol flags (8-bits) with a total of 120 bits. The number of fields and total width of the fields may increase for future applications.

Rules can be represented in a number of ways including exact number match, prefix match, range match, and wildcard match. Wildcard match was chosen to be the only method of rule representation that did not sacrifice generality. Any other forms of matching are translated into one or multiple wildcard match rules. A wild card match rule is defined as a ternary string, where each bit can take one of three possible values: '1', '0', or 'x'. A bit of '1' or '0' in the rule requires the matching search key bit in the corresponding position to have exactly the same value, and a bit of 'x' bit in the rule can match either '0' or '1' in the search key.

An example of a rule specification on a 16-bit field is given below:

The classifier wants to match
    1111    0000    xx1x    0xx1
The mask is:
    1111    1111    0010    1001
The target value is:
    1111    0000    0010    0001

Prefix match rules can be represented in wildcard rules naturally by contiguous 'x' bits in the rules. However the don't-care bits in a general wildcard do not have to be contiguous. Ranges or multiple disjoint point values may be defined by using multiple masked matching rules. For example, an 8-bit range must be broken into two masked matching rules '00010xxx' and '00110xx'. Even with this limitation, the masked matching form is still considered to be an efficient representation, because most of the ranges in use can be broken down into a small number of mask rules. A compiler can handle the task of breaking down user rule specification in a convenient syntax, therefore the complexity can be hidden from the user.

Each rule represents a region in the multi-dimensional space. Each search key (representing a packet to be classified) defines a point in this space. Points that fall into one region are classified as a member of the associated class. Ambiguity arises when multiple regions overlap each other. A single priority order is defined among the rules to resolve the ambiguity. The rules are numbered from 0 to N−1. The rule indices define the priority among the rules in ascending order. The region with higher priority will cover the region with lower priority. In other words, if a packet satisfies both rule[i] and rule[j], if i<j, it is classified into class[i], otherwise into class[j].

One advantage of mask matching is its dimension independence. Multiple fields concatenated can be classified with the same method as if they were one wide field. This is accomplished by concatenating the masks of the target strings.

The prior solutions can be grouped into the following categories:

Sequential Match

For each arriving packet, this approach evaluates each rule sequentially until a rule is found that matches all the fields of the search key. While this approach is simple and efficient in use of memory (memory size grows linearly as the size of the rule set increase), this approach is unsuitable for high-speed implementation. The time required to perform a lookup grows linearly with rule set size.

Grid of Tries

The 'Grid of Tries' (or Tuple Space Search) uses extension of tries data structure to support two fields per search key. This is a good solution for two-dimensional rule set. But it is not easy to extend the concept to more fields. The cross-producting scheme is an extension of the 'Grid of Tries' that requires linear search of the database to find the best matching filter. Hence the effectiveness of cross-producting is not clear. The grid of tries approach requires intensive precompute time. The rule update speed is slow.

A scheme based on tries is presented by Douceur et al. in U.S. Pat. No. 5,995,971 and U.S. Pat. No. 5,956,721. This method utilizes a tri-indexed hierarchy forest ("Rhizome") that accommodates wildcards for retrieving, given a specific input key, a pattern stored in the forest that is identical to or subsumes the key. This approach has the weakness of not supporting "conflict" between patterns (as stated in line 21~26, column 22 of U.S. Pat. No. 5,995,971). Patterns that partially overlap but do not subsume one another (E.g. pattern "100x" and "1x00") are in "conflict" because they overlap each other partially, may not be stored in the rhizome defined by the invention, since no defined hierarchical relationship holds for these patterns. In networking applications, these conflicts widely exist in router access list and firewall policies. This weakness limits the use of the classification scheme.

Concurrent Cross Producting

T. V. Lakshman in "High Speed Policy-Based Packet Forwarding Using Efficient Multi-Dimensional range Matching", Proceedings of ACM SIGCOMM' 98 Conference, September, 1998, presented a hardware mechanism for concurrent matching of multiple fields. For each dimensional matching this scheme does binary search on projections of regions on each dimensions to find the best match region. A bit-level parallelism scheme is used to solve the crossproducting problem among dimensions. The memory size required by this scheme grows quadratically and memory bandwidth grows linearly with the size of the rule set. Because of the computation complexity in the cross-producting operating, this scheme has a poor scaling property. This scheme also requires a time consuming data structure generation process, hence the rule update speed is slow.

Ternary CAM

Hardware Ternary CAMs (Content Addressed Memory) can be used for classification. Ternary CAMs store three value digits: '0', '1' or 'X' (wildcard). The CAMs have good look-up performance, fast rule update time. But the hardware cost (silicon area) and power consumption are high. More over, the CAMs require full-custom physical design that prevents easy migration between different IC technologies. For these reasons, current available CAMs are typically small.

Recursive Flow Classification

The recursive flow classifier (RFC) as discussed in Pankaj Gupta and Nick Mckeown, "Packet Classification on Multiple Fields", Sigcomm, September 1999, Harvard University and Pankaj Gupta and Nick Mckeown, "Packet Classification using Hierarchal Intelligent Cuttings", Proc. Hot Interconnects VII, August 99, Stanford, exploits the heuristics in typical router policy database structure(router microflow classifier, access list, fireware rules). RFC uses multiple reduction phases; each step consisting of a set of parallel memory lookups. Each lookup is a reduction in the sense that the value returned by the memory lookup is shorter (is expressed in fewer bits) than the index of the memory access. The algorithm can support very high lookup speed at relatively low memory bandwidth requirement. Since it relies on the policy database structure, in the worst case, little reduction can be achieve at each step. Hence the performance becomes indeterministic. In a normal case, the lookup performance gain is achieved at the cost of high memory size and very long precomputation time. For a large ruleset (16K), the RFC precompute time exceeds the practical limit of a few seconds. In general, RFC is suitable for small classifiers with static rules.

Based on the above, any solution developed must therefore have a number of features. The first is that of a fast look up speed. Since look up speed is determined by the number of steps (or hardwired clock cycles) required to perform each look up, any solution must have either a small constant value for its number of steps or this must be bounded by a small constant value. The second requirement is that any solution must be capable of supporting a large mask-matching rule set size. The size of the rule set must be capable of expansion at linear hardware/memory cost without sacrificing throughput.

A third requirement is of an expandable field width. A solution must allow for variable width of a search key or must support varied number of dimensions (number of fields) at linear cost.

A fourth requirement is that in implementing a solution no external memory should be required. many classification methods consume either a huge amount of memory storage and/or memory bandwidth. Both external memory storage and memory bandwidth are expansive factors that must be considered in chip architecture. These factors directly affect chip feasibility if either factor is too large. A solution should limit the rule set data structure in on-chip memory to prevent off-chip memory accesses.

A solution should also allow for fast rule updates. it should have a linear pre-compute time for rule set data structures random (non-intrusive) access to rule set image to allow for fast incremental insertion, deletion, and modification of individual rules. Some classification methods require a very long pre-processing time and/or intrusive reload of rule image data structure for a small change in the rule set. The long update/pre-processing time prevents such methods from being effective for microflow classification for provision of differentiated/integrated QOS (Quality of Service) where the rule sets are often session dependent or require frequent updates with low latency tolerance.

Ideally, a solution should not rely on the heuristics by how rules are structured. It should give deterministic performance and cost for an arbitrary rule set of certain size. This allows such a solution to be used to support existing and future applications where rule structures are not well understood.

SUMMARY OF THE INVENTION

The present invention avoids the shortcomings of the prior art and meets the above needs by providing methods and apparatus for finding a match between a target bit pattern and multiple filter bit patterns. A filter array is created from the filter bit patterns and at least one intermediate array is generated from the filter array. Specific columns of the intermediate arrays are then extracted based on bit values of the target bit pattern. A row by row AND operation is performed on these columns to arrive at a match vector. the match vector identifies which of the filter bit patterns in the filter array match the target bit pattern. The method is implemented by using multiple classifier elements operating in parallel with each classifier element handling multiple filter bit patterns.

In a first aspect, the present invention provides a method of determining whether a target bit pattern matches at least one of a plurality of filter bit patterns, each bit pattern being composed of a specific sequence of element bits, each element bit in said target bit pattern having a value of either 1 or 0 and each element bit in said filter bit pattern having a value of 1, 0, or x where x can be matched by any value of an element bit, the method comprising generating a target vector from said target bit pattern, generating a filter array from said plurality of filter bit patterns, each filter bit pattern corresponding to a row in said filter array, generating at least one intermediate array based on said filter array, selecting specific columns from said at least one intermediate array based on bit values of said target vector, generating a final array from columns selected and generating a match vector from said final array, each vector element of said match vector being a result of a bitwise AND operation on a row of said final array, wherein each vector element in said match vector has a value of 1 which indicates a match between said target bit pattern and a filter bit pattern corresponding to a row in said filter array having the same row number as said vector element.

In a second aspect the present invention provides a system for matching a target bit pattern with a plurality of filter bit patterns, said system comprising, a field register containing said target bit sequence, a plurality of classifier elements, each classifier element being associated with a group of filter bit patterns, each classifier element receiving said target bit pattern from said field register, and each classifier element outputting a filter identifier identifying which filter bit pattern from the group of filter bit patterns associated with said classifier element matches said target bit pattern and a priority multiplexer receiving outputs from said classifier elements, said priority multiplexer determining which of said outputs of said classifier elements has highest priority.

In a third aspect the present invention provides a classifier element for matching a target bit pattern with a plurality of filter bit patterns, the classifier element comprising an input stage receiving said target bit pattern and having a plurality of stage outputs, each stage output being a portion of said target bit pattern, a multiplexer stage receiving said stage outputs, said multiplexer stage selecting one of said stage outputs as a multiplexer output based on a sequencer output, a memory stage unit receiving said multiplexer output and said sequencer output, a storage unit having an output determined by said multiplexer output and said sequencer output, said memory stage unit storing intermediate arrays generated from said filter bit patterns, gate means for performing an AND operation between successive storage unit outputs and a match vector, to produce a new match vector, new said match vector indicating which filter bit pattern matches said target bit pattern and match vector storage means for storing said match vector, said match vector storage means receiving said new match vector to overwrite an old match vector, said match vector storage means outputting said new match vector.

In a fourth aspect the present invention provides method of determining whether a target bit pattern matches at least one of a plurality of filter bit patterns, each bit pattern being composed of a specific sequence of element bits, each element bit in said target bit pattern having a value of either 1 or and each element bit in said filter bit pattern having a value of 1, 0, or x where x can be matched by any value of an element bit, the method comprising:

a) generating a target vector from said target bit pattern;
b) generating a filter array from said plurality of filter bit patterns, each filter bit pattern corresponding to a row in said filter array;
c) generating at least one intermediate array based on said filter array;
d) selecting specific columns from said at least one intermediate array based on bit values of said target vector;
e) generating a final array from columns selected in step d); and
f) generating a match vector from said final array, each vector element of said match vector being a result of a bitwise AND operation on a row of said final array, wherein each vector element in said match vector having a value of 1 indicates a match between aid target bit pattern and a filter bit pattern corresponding to a row in said filter array having the same row number as said vector element.

BRIEF INTRODUCTION TO THE DRAWINGS

A better understanding of the invention will be obtained by a consideration of the detailed description below, in conjunction with the following drawings, in which.

DETAILED DESCRIPTION OF THE PREFERRED EMBODIMENT

Figure 1:
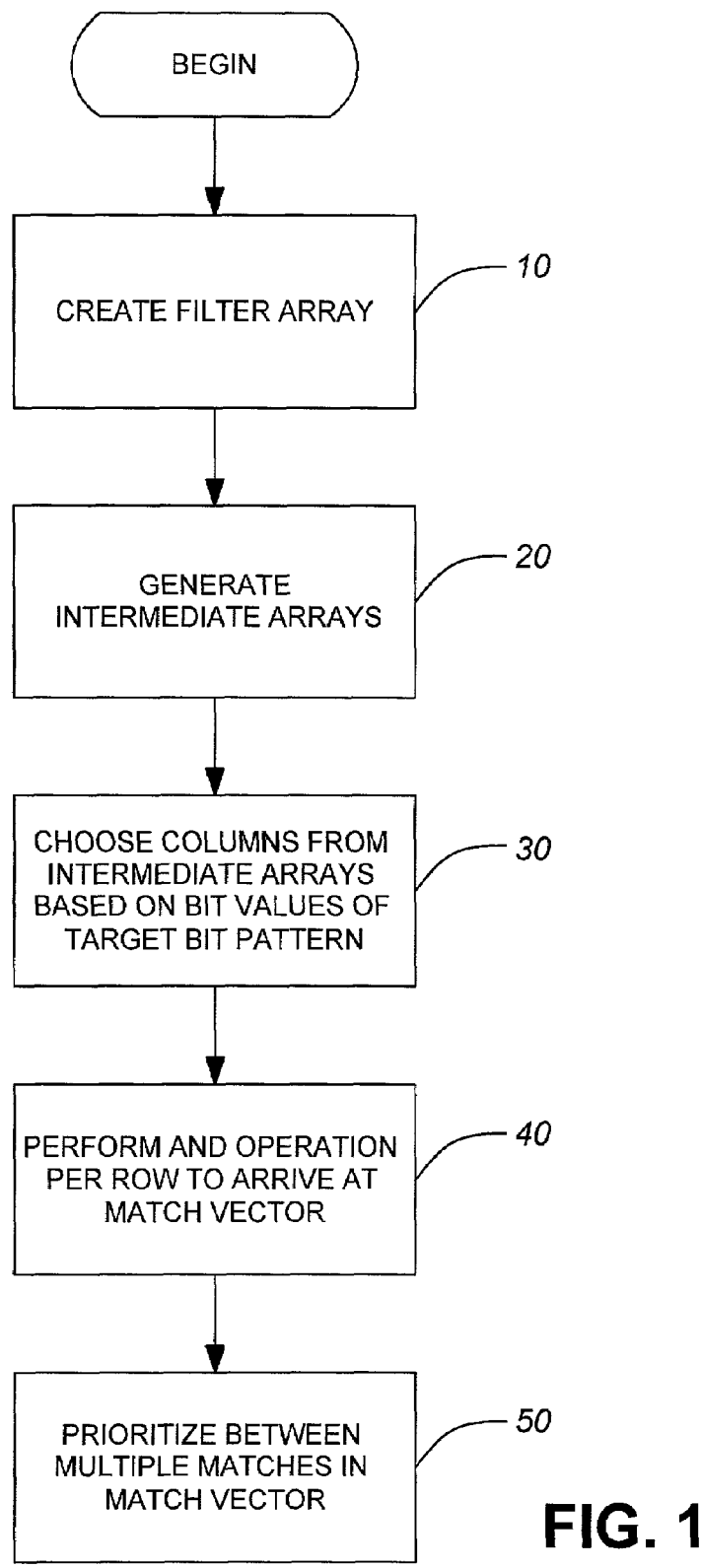
FIG. 1 is a general flow chart illustrating steps in a masked matching method.

To clarify the terminology used in this description the following definitions are provided:

Filter: A filter defines a mask-matching rule. The method below assumes that a filter contains W bits and forms a concatenation of all the fields at which the classifier needs to look. A filter is further defined as a W-bit 3-value rule set. Each bit can take either '1', '0', or 'x', which means that the bit needs to be 1, 0, or don't-care (x) to match this filter. Each rule can also be termed a filter bit.

Rule Set: A rule set is a collection of N filter rules indexed from 1 to N. The rule set defines a single order of priority. A rule with larger index value has higher priority than a rule smaller index. The symbols F[0] . . . F[N−1] are used to represent filters 0 . . . N. A rule set can be represented by the 3-value matrix F[N,W], where F[i,j] means the mask matching value of rule i bit j.

Field Vector: The packet field data to be classified. It is W-bit 2-value vector (either '0' or '1') that is the concatenation of the key fields of a data packet. The field vector is represented by the symbol K[0 . . . W−1]. This is also termed as a target bit pattern.

It should be noted that, essentially, the methods outlined below seeks to find a match between two bit patterns: a target pattern and a filter bit pattern.

As can be seen from the definitions above, the Rule set is an array F[N,W] of filter bit patterns. From this filter array F[N,W], the first method (Mask Matching Method) can generate two intermediate arrays P and Q.

The Mask Matching Method requires some pre-computations that translate the 3 value Rule Set Array F[NxW] into two 2 value arrays: The P[NxW] and Q[NxW], or the Positive Array and the Negative Array. The Positive Array P is the necessary (but not sufficient) condition of matching a filter with field vector bit set to '1'; and the Negative Array for filter bit set to '0'.

The intermediate arrays P and Q are generated by examining a value of a position in the filter array F. If the value of F[i,j]=0, then P[i,j]=0 and Q[i,j]=1. If F[i,j]=1, then P[i,j]=1 and Q[i,j]=0. if F[i,j]=x, then P[i,j]=Q[i,j]=1. Clearly, in the above discussion 0≦i≦w−1 and 1≦j≦N−1. It should be reiterated that there are W bits in each filter bit pattern and that there are N filter bit patterns.

In pseudo-C code, the P and Q arrays can be generated by:

```
The MMA-Precompute Algorithm
for (i=0; i<N; i++)
    for (j=0; j<W; j++)
        switch (F[i][j])
        {
```

```
case '0':P[i][j]=0; Q[i][j]=1; break;
case '1':P[i][j]=1; Q[i][j]=0; break;
case 'x':P[i][j]=1; Q[i][j]=1; break;
```

Once the P and Q arrays are generated, the mask matching method then processes the target bit pattern (or field vector) bit by bit to arrive at a match vector.

The method processes the input vector one-bit at a time, for each bit in the field vector K[j], the corresponding column vector from either the Positive or Negative matrix is fetched. The bit value of K[j] determines where to fetch the column vector from. If K[j]=1, col vector=Q[0 . . . N−1] [j] unless K[j]=1 then col vector=[0 . . . N] [j], the P[0 . . . N−1] [j] is used otherwise the Q[0 . . . N−1] [j]. The fetched column vectors are bit-wise ANDed together to form the match vector M. The N-bit match vector M contains a bit map representing all the matched filters. Finally a priority encoder produces the index of the matched filter with highest priority from the M vector.

The computation of the M vector according to bits in K can be completely parallelized since there is no dependency among the bits/columns.

In pseudo code, this part of the process is represented by:

```
for (i=0; i<N; i++)
    p[i] = 1;
for (i=0; i<W; i++)
    for (j=0; j<N; j++)
        p[j] = p[j] & (K[i]?P[j][i]:Q[j][i])
```

The pseudo code processes one bit in the K vector at a time (in the innermost loop body). If the bit value is 1, it fetches the corresponding column from the positive array P, otherwise the negative column Q. All the fetched columns are bit-wise ANDed together to produce a vector (p) that represents the match results. Finally, a priority encoding operation produces the index of the matching rule with highest priority.

For further clarity, the following example of the mask matching method is provided:

Problem: There are 6 4-bit wide filters arranged in ascending priority order below:

| Filter 0: | x x x x x |
| Filter 1: | 1 1 x 0 0 |
| Filter 2: | 0 0 1 1 0 |
| Filter 3: | 1 1 1 1 x |
| Filter 4: | x x 1 x 0 |
| Filter 5: | 0 x 0 0 x |

Classify the vector (10110)

The solution proceeds thus:

The filter array is first generated by aggregating the filter bit patterns into an array F:

$$F = \begin{bmatrix} x & x & x & x & x \\ 1 & 1 & x & 0 & 0 \\ 0 & 0 & 1 & 1 & 0 \\ 1 & 1 & 1 & 1 & x \\ x & x & 1 & x & 0 \\ 0 & x & 0 & 0 & x \end{bmatrix}$$

Calculate the Positive/Negative (P and Q) arrays from the filter array:

$$F = \begin{bmatrix} x & x & x & x & x \\ 1 & 1 & x & 0 & 0 \\ 0 & 0 & 1 & 1 & 0 \\ 1 & 1 & 1 & 1 & x \\ x & x & 1 & x & 0 \\ 0 & x & 0 & 0 & x \end{bmatrix} \Rightarrow P = \begin{bmatrix} 1 & 1 & 1 & 1 & 1 \\ 1 & 1 & 0 & 0 & 0 \\ 0 & 0 & 1 & 1 & 0 \\ 1 & 1 & 1 & 1 & 1 \\ 1 & 1 & 1 & 1 & 0 \\ 0 & 1 & 0 & 0 & 1 \end{bmatrix} \quad Q = \begin{bmatrix} 1 & 1 & 1 & 1 & 1 \\ 0 & 0 & 1 & 1 & 1 \\ 1 & 1 & 0 & 0 & 1 \\ 0 & 0 & 0 & 0 & 1 \\ 1 & 1 & 0 & 1 & 1 \\ 1 & 1 & 1 & 1 & 1 \end{bmatrix}$$

With the P and Q arrays in place, the target bit pattern (target or field vector) 10110 is then processed. For each bit of the target bit pattern, a bit's position defines a column number and that bits' value determines from which intermediate array the column is retrieved. If the bit has a value of 1, the corresponding column is retrieved from the P array and if the bit has a value of 0, the corresponding column from the Q array is retrieved. Thus, for the target bit pattern $1_{(0)} 0_{(1)} 1_{(2)} 1_{(3)} 0_{(4)}$ (with subscripts denoting a bit's column position), columns 0, 2 and 3 are retrieved from the P array while columns 0 and 4 are retrieved from the Q array. the resulting array is therefore:

| $P_{(0)}$ | $Q_{(1)}$ | $P_{(2)}$ | $P_{(3)}$ | $Q_{(4)}$ |
|---|---|---|---|---|
| 1 | 1 | 1 | 1 | 1 |
| 1 | 0 | 1 | 0 | 1 |
| 0 | 1 | 1 | 1 | 1 |
| 1 | 0 | 1 | 1 | 1 |
| 1 | 1 | 1 | 1 | 1 |
| 0 | 1 | 0 | 0 | 1 |

A bit wise AND operation is then performed across each row to result in a match vector as follows:

| $P_{(0)}$ | $Q_{(1)}$ | $P_{(2)}$ | $P_{(3)}$ | $Q_{(4)}$ | | match vector |
|---|---|---|---|---|---|---|
| 1 | 1 | 1 | 1 | 1 | | 1 |
| 1 | 0 | 1 | 0 | 1 | | 0 |
| 0 | 1 | 1 | 1 | 1 | ==> | 0 |
| 1 | 0 | 1 | 1 | 1 | | 0 |
| 1 | 1 | 1 | 1 | 1 | | 1 |
| 0 | 1 | 0 | 0 | 1 | | 0 |

Since rows 0 and 4 in the match vector have a value of 1, this means that rows 0 and 4 in the filter array (corresponding to filter bit patterns 0 and 4) match the target bit pattern.

Since more than one filter bit pattern matches the target bit pattern, the final result is to be determined by priority encoding. thus, for multiple matches, the matching filter bit pattern with the highest priority will be the final result. in the example, if a lower number indicates a lower priority, then filter bit pattern 4 must take precedence over filter bit pattern 0.

The method above requires a storage space of 2×N×W bits and each lookup requires N×W bit fetches.

One approach to speed up the above process is to lookup multiple bits at a time. this approach, termed the enhanced masked matching method (EMMM) attempts to trade off memory space for memory bandwidth.

The speedup factor s represents the number of bits EMMM processes at each step. For simplicity, s should be divisible by W, the width of the filter. When s is equal to 1, EMMM becomes the basic Masked Matching Method.

The EMMM breaks the field vector and the filter vectors into sets of s-bit-wide chunks. The number of chunks is W/s. For each chunk, a 3-dimensional partial match array for all the bit combinations in the chunk is precomputed. The partial match is represented by:

M[N] [W/s][$2^s$]

As an aside, if W is not divisible by S, one can easily adjust W to W' which is the minimum multiple of S that is greater than W (W'=(Floor (W/S)+1)*S. After the expansion of key width to W', then all the rules in the rule set should be padded with (W'-W) bits of wild cards ('X') bits at the least significant bits. The search key should also be expanded from W-bit wide to W'-bit wide by padding (W'-W) bits of '0' (or'1', the actual bits used for padding does not matter). This width alignment/expansion process will cause a little bit of extra memory in the representation of the EMMM array, but for any search key, the search using the expanded W'-bit key and the expanded rule-set will generate an identical result as the original key in the original rule-set.

Returning to the discussion, in C code, this precomputation is done by the following:

```
Match (x,y) // x is s-bit binary vector, y is s-bit
ternary vector
{
    result =1;
    for (t=0; t<s; t++)
    {
        switch (y[t])
        {
            case 'x': p =1; break;
            case '1': p = (x[t]==1); break;
            case '0': p = (x[t]==0); break;
        }
        result = result & p;
    }
    return result;
}
for (i=0; I<W/s; i++)    // i : the chunk
    for (j=0; j<$2^s$ ; j++)    //j: enumerate s-bit
combinations
        for (l=0; l<N; l++) //l: enumerate all rules
            M[l][i][j] = Match(j, F[l][i*s+s-1: i*s]);
```

The partial match array M[k] [i] [j] represents the precomputed partial match result for all the bit combinations within the chunk, where i specifies the chunk index, j specifies an s-bit combination value, and k indexes the N-bit partial filter matching result.

The EMMM is quite similar to the first method except that bits in the field vector are processed in s-bit chunks. For each chunk, the field bits are used to index into the 3-D partial match array to fetch the N-bit partial match result vector.

The fetched partial match vector is then ANDed together for each chunk to form the complete match vector.

To support intrusion free rule update, each rule has an enable register bit indicating if the rule is used in the match method. N register bits are required in total. The EMMM also uses a classremap table to allow the logical rule identifier to be different from the physical location of the rule within the rule set. The priority encoder produces the best-matched physical rule position. The physical rule position is used to do an indexed lookup to the classremap table to produce the logical rule identifier.

The following pseudo code provides a sequential description of EMMM:

```
for (i=0; i<N; i++)
    p[i] =1;
for (i=0; i<W/s; i++)
{
    t= i*W/s;
    j = K[t+s−1: t]; // take out the bits of the
current chunk
    for (k=0; k<N; k++)
        p[k] = enable[k] & p[k] & (M[k][i][j]);
}
```

Do priority encoding on p vector to produce the best match class ID-pid;

Return classremap [pid];

To clarify the above, the following example is provided where it is assumed that the rule set (the set of filter bit patterns) has 4 6 bit wide rules (filter bit patterns) and that the chunk size is S=2.

|  | Filters: |  |  |  |  |  |
|---|---|---|---|---|---|---|
|  | Filter 0: | x | x | x | x | x | x |
|  | Filter 1: | 1 | 1 | x | 0 | 0 | 1 |
|  | Filter 2: | 0 | 0 | 1 | 1 | 0 | x |
|  | Filter 3: | 1 | 1 | 1 | 1 | x | 0 |
|  | Target bit pattern: | 1 | 1 | 0 | 0 | 0 | 1 |

The filter array is created thus:

| x | x | x | x | x | x |
|---|---|---|---|---|---|
| 1 | 1 | x | 0 | 0 | 1 |
| 0 | 0 | 1 | 1 | 0 | x |
| 1 | 1 | 1 | 1 | x | 0 |

This filter array is then divided into chunks of S bits:

| x | x | x | x | x | x |
|---|---|---|---|---|---|
| 1 | 1 | x | 0 | 0 | 1 |
| 0 | 0 | 1 | 1 | 0 | x |
| 1 | 1 | 1 | 1 | x | 0 |
| chunk0 | | chunk1 | | chunk2 | |

For each chunk, an intermediate array is created along with all possible combinations of S bits.

Chunk 0:

| Filter chunk: | x | x |  |  |
|---|---|---|---|---|
|  | 1 | 1 |  |  |
|  | 0 | 0 |  |  |
|  | 1 | 1 |  |  |
| Bit combinations: | 00 | 01 | 10 | 11 |
| Intermediate array: | 1 | 1 | 1 | 1 |
|  | 0 | 0 | 0 | 1 |
|  | 1 | 0 | 0 | 0 |
|  | 0 | 0 | 0 | 1 |

To clarify how this is done, it should be noted that each bit combination is associated with a specific column of the intermediate array and that column is generated based on the chunk of the filter array and the bit combinations.

If we take the bit combination and the chunk of the filter array as above, for the column associated with that bit combination a 1 is entered when the bit combination matches the row of the filter array and a 0 is entered when there is no match. Thus, the top row of the 00 column has a 1 because 00 matches the top row of the filter array chunk (i.e. xx matches 00). The second row of column 00 has a 0 because the bit combination 00 does not match the second row of the filter array chunk (i.e. 11 does not match 00). the second row from the bottom of column 00 has a 1 because the second row from the bottom of the filter array chunk matches the bit combination 00.

The rest of the intermediate array is populated in the same manner. The last column of the intermediate array (column 11) has a 1 in its bottom row since the bit combination 11 matches the last row of the chunk filter array.

The rest of the filter array chunks and their intermediate arrays are treated similarly:

| Chunk 1: | | | | |
|---|---|---|---|---|
| Filter chunk: | x | x |  |  |
|  | x | 0 |  |  |
|  | 1 | 1 |  |  |
|  | 1 | 1 |  |  |
| Bit combinations: | 00 | 01 | 10 | 11 |
| Intermediate array: | 1 | 1 | 1 | 1 |
|  | 1 | 0 | 1 | 0 |
|  | 0 | 0 | 0 | 1 |
|  | 0 | 0 | 0 | 1 |
| Chunk 2: | | | | |
| Filter chunk: | x | x |  |  |
|  | 0 | 1 |  |  |
|  | 0 | x |  |  |
|  | x | 0 |  |  |
| Bit combinations: | 00 | 01 | 10 | 11 |
| Intermediate array: | 1 | 1 | 1 | 1 |
|  | 0 | 1 | 0 | 0 |
|  | 1 | 1 | 0 | 0 |
|  | 1 | 0 | 1 | 0 |

After the intermediate arrays have been generated, the target bit pattern is also divided into chunks of S bits and correlated with their respective chunk positions. Thus:

```
Target bit pattern: 110001
Chunk 0 of target bit pattern: 11
Chunk 1 of target bit pattern: 00
Chunk 2 of target bit pattern: 01
```

For each chunk positions of the target bit pattern, the column (for the intermediate array in that chunk), for the bit combination matching the target bit pattern chunk is retrieved. thus, for chunk 0 (target bit pattern 11), the column 11 in the intermediate array for chunk 0 is retrieved.

For chunk 1, the column 00 is retrieved and for chunk 2, the column 01 is retrieved. All these retrieval columns are then ANDed row by row to result in a match vector. Thus:

|               | Chunk 0 |   | Chunk 1 |   | Chunk 2 |   |   |
|---------------|---------|---|---------|---|---------|---|---|
| Filter Chunk: | 11      |   | 00      |   | 01      |   |   |
| Columns:      | 1       | & | 1       | & | 1       | → | 1 |
|               | 1       | & | 1       | & | 1       | → | 1 |
|               | 0       | & | 0       | & | 1       | → | 0 |
|               | 1       | & | 0       | & | 0       | → | 0 |

The match vector is thus 1100. The position of the 1's in the match vector match the position in the filter array of the filter bit patterns which match the target bit pattern. Thus, from the match vector, filters 0 and 1 match the target bit pattern. If the previous priority encoding scheme is used, with a higher number denoting a higher priority, filter 1 takes precedence over filter 0 and thus becomes the final result of the exercise.

EMMM supports intrusion free rule update. The update operations to the partial match database can be done in parallel while lookup operations are in progress.

The copy operation is used in both rule insertion and deletion. The following pseudo code shows how copy is done from rule x to rule y.

```
EMMM rule copy - copy rule x to rule y
Enable[y] =0;    // disable rule y;
for (i=0; i<W/s; i++)
    {
        for (j=0; j<2^s ; j++)    //j: enumerate s-bit
        combinations
        M[y][i][j] = <M[x][i][j];
    }
classremap[y]=classremap[x];
Enable[y] =1; // enable rule y;
```

To delete rules or filter bit patterns the following pseudo code can be used:

```
EMMM rule deletion - delete rule x;
Enable[x] =0;
for (i=x; i<N-1; i++)
    {
        enable[i] =0;
        copy (i+1, i);
    }
enable[N] =0;
```

For inserting rules or filter bit patterns, the following code can be used:

```
EMMM rule insertion - insert NEWRULE to position x;
Calculate the partial match result for the new rule
and store it in NEWRULE array;
for (i=N-1; i>=x; i++)
    {
        copy (i, i+1);
    }
enable[x] =0;
for (i=0; i<W/s; i++)
    {
        for (j=0; j<2^s ; j++)    //j: enumerate s-bit
        combinations
        M[x][i][j] = <NEWRULE[i][j];
    }
enable[x]=1;
```

It should be reiterated that the above code calculates the intermediate arrays for the new rule/filter bit pattern as well as inserting the new rule.

The two methods outlined above, the mask matching method and its improvement, the enhanced mask matching method (EMMM), can be generalized into a few discrete steps. These steps are illustrated in the flow chart of FIG. 1.

The process begins at step 10 when the filter array is created from the filter bit patterns. Step 20 is that of generating the intermediate arrays. For the mask matching method, a P and a Q array are generated while for EMMM, one intermediate array is generated for each chunk of the filter array.

Once the intermediate arrays have been generated, step 30 is that of selecting specific columns from the intermediate arrays based on bit values of the target bit pattern. For the mask matching method, if the bit value is 1, then the corresponding column from the P array is chosen. If the bit value is 0, then the column from the Q array is selected.

With all the columns selected, step 40 is that of performing an AND function across each row of the selected columns. This results in a match vector, the elements of which indicate the rows in the filter array that match the target bit vector.

If there is more than one filter bit pattern matching the target bit pattern, step 50 is that of prioritizing between these matching filter bit vectors. While the examples above used a higher priority number as having a higher priority, other schemes may be used.

Figure 2:
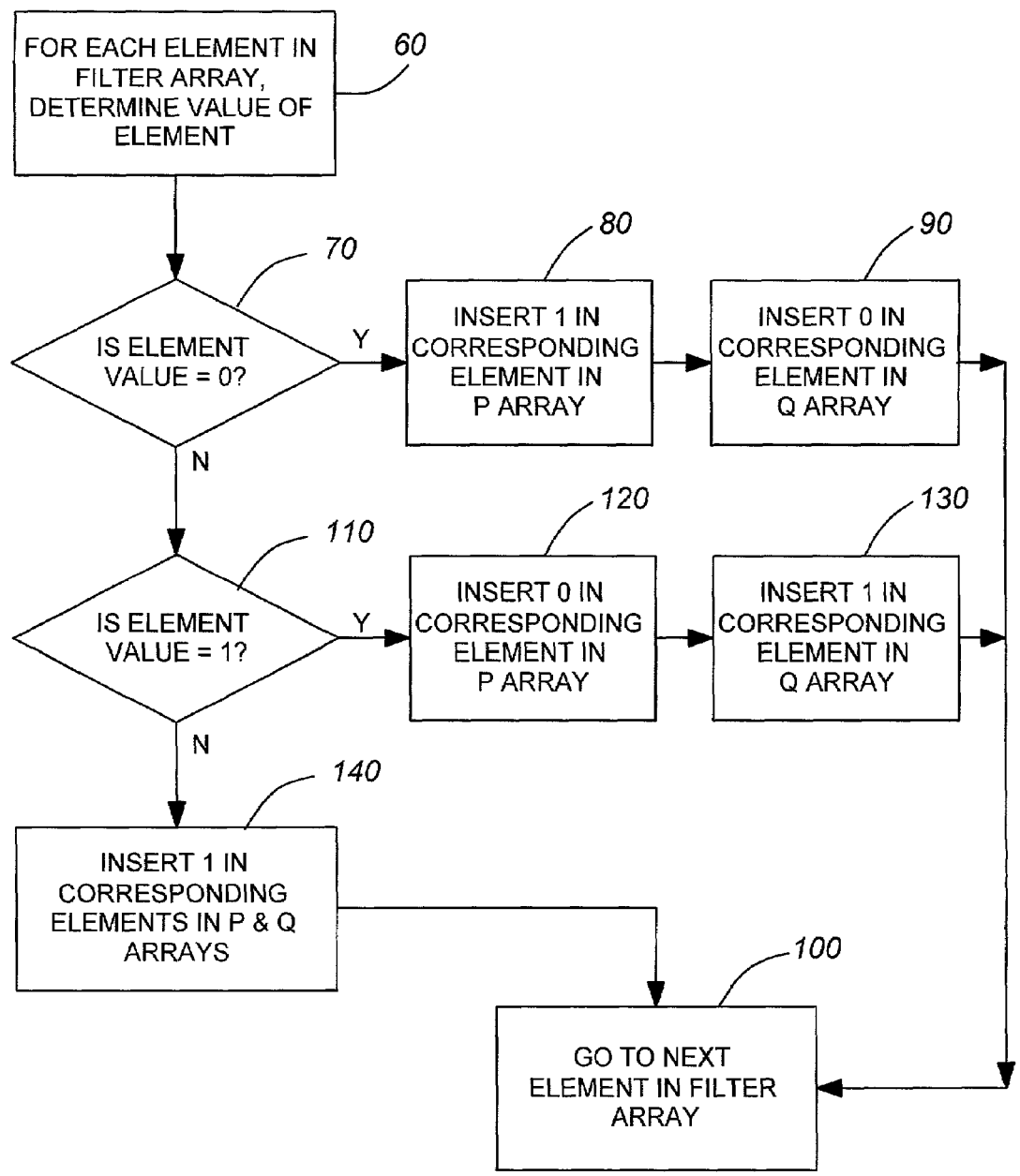
FIG. 2 is a flow chart illustrating the steps in how P and Q arrays are populated in a masked matching method.

Referring to FIG. 2, illustrated in the flow chart are the steps involved in generating the P and Q intermediate arrays for the masked matching method. This sub process begins in step 60 with the determination of the value of each element in the filter array. Step 70 is deciding if the filter array element has a value of 0. If so, then step 80 is that of inserting a value of 1 for an element in the P array having the exact position as the filter array element examined. Step 90 is that of inserting a value of 0 for an element in the Q array having the exact same position as the filter array element examined. Step 100 is that of going to the next element in the filter array.

If the result of decision 70 is negative, then decision 110 this to determine if the value of the filter array is 1. If so, then step 120 is that of entering a value of 0 in the P array for the element. Step 130 is similar to step 120 except that a value of 1 is entered in the Q array for the same element position. After step 130, step 100 is executed—that of retrieving the next element in the filter array.

If the result of decision 110 is still negative, this means that the value of the filter array element result be X. For this, a value of 1 is inserted in both the P and the Q arrays for the same position as the filter array element being examined (step 140). After step 140, step 100 is executed.

By continuously executing the sub process in FIG. 2, the P and Q arrays will be populated for the mask matching method.

Figure 3:
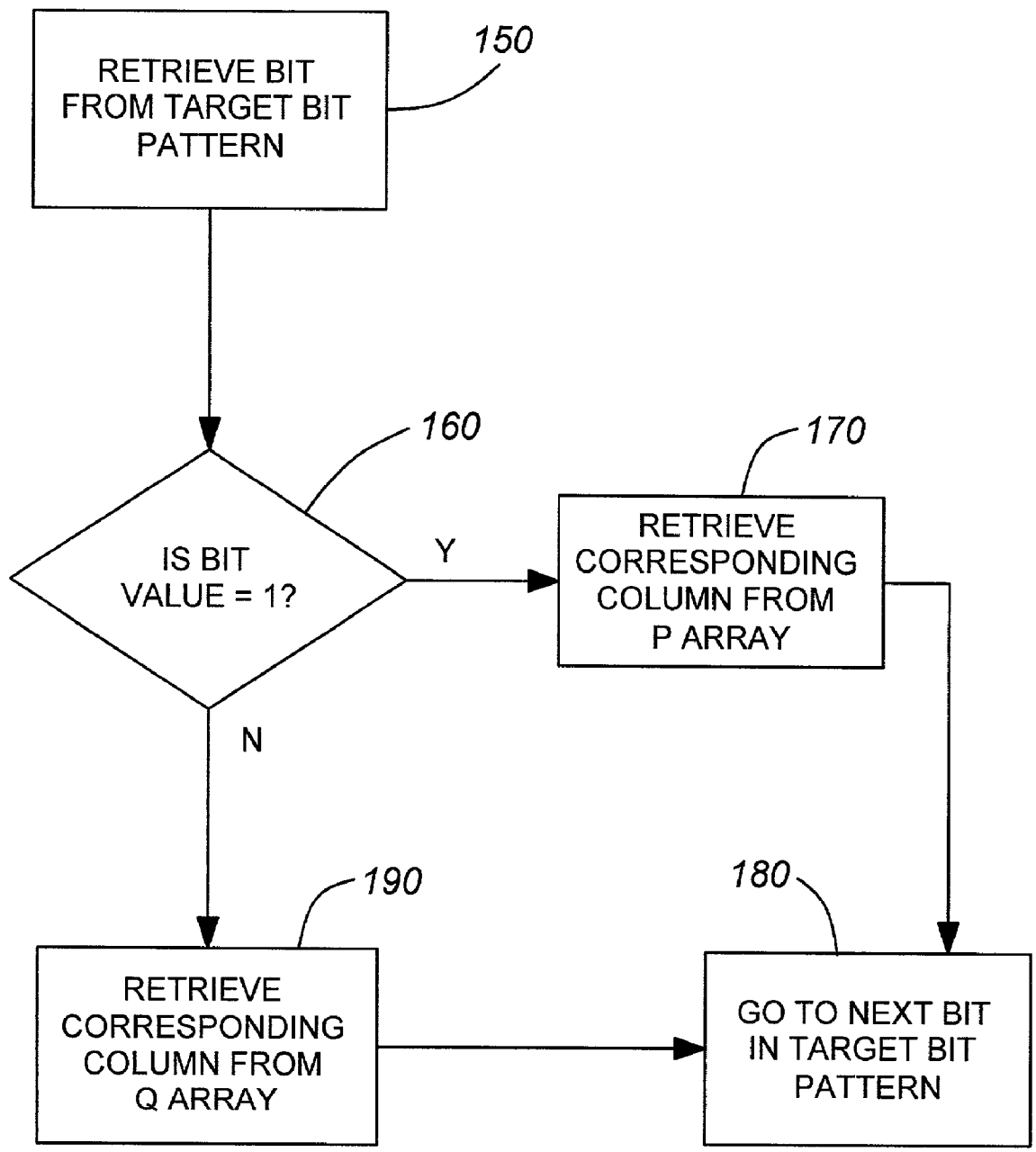
FIG. 3 is a flow chart illustrating the steps in determining which column to retrieve for the method illustrated in FIG. 2.

FIG. 3 illustrates how the mask matching method selects the columns from the intermediate arrays. As can be seen, the sub process starts by retrieving a bit from the target bit pattern (step 150). Decision 160 determines if the bit retrieved has value of 1. If so, then step 170 is that of retrieving the corresponding column from the P array that is, if the bit retrieved is in column "a" of the target bit pattern, then column "a" of the P array is retrieved. The next step, step 180, is that of moving to the next bit which is the target bit pattern.

If the result of decision 160 is negative, then the value of the retrieved bit must be 0. Thus, as step 190 shows, the corresponding column from the Q array must be retrieved. This is done in the same manner as in step 170 for the array. After step 190, step 180 is then executed.

The steps in FIG. 3, when executed until the target bit pattern is exhausted, should result in a number of columns on which step 40 of FIG. 1 can be executed to result in the match vector.

Figure 4:
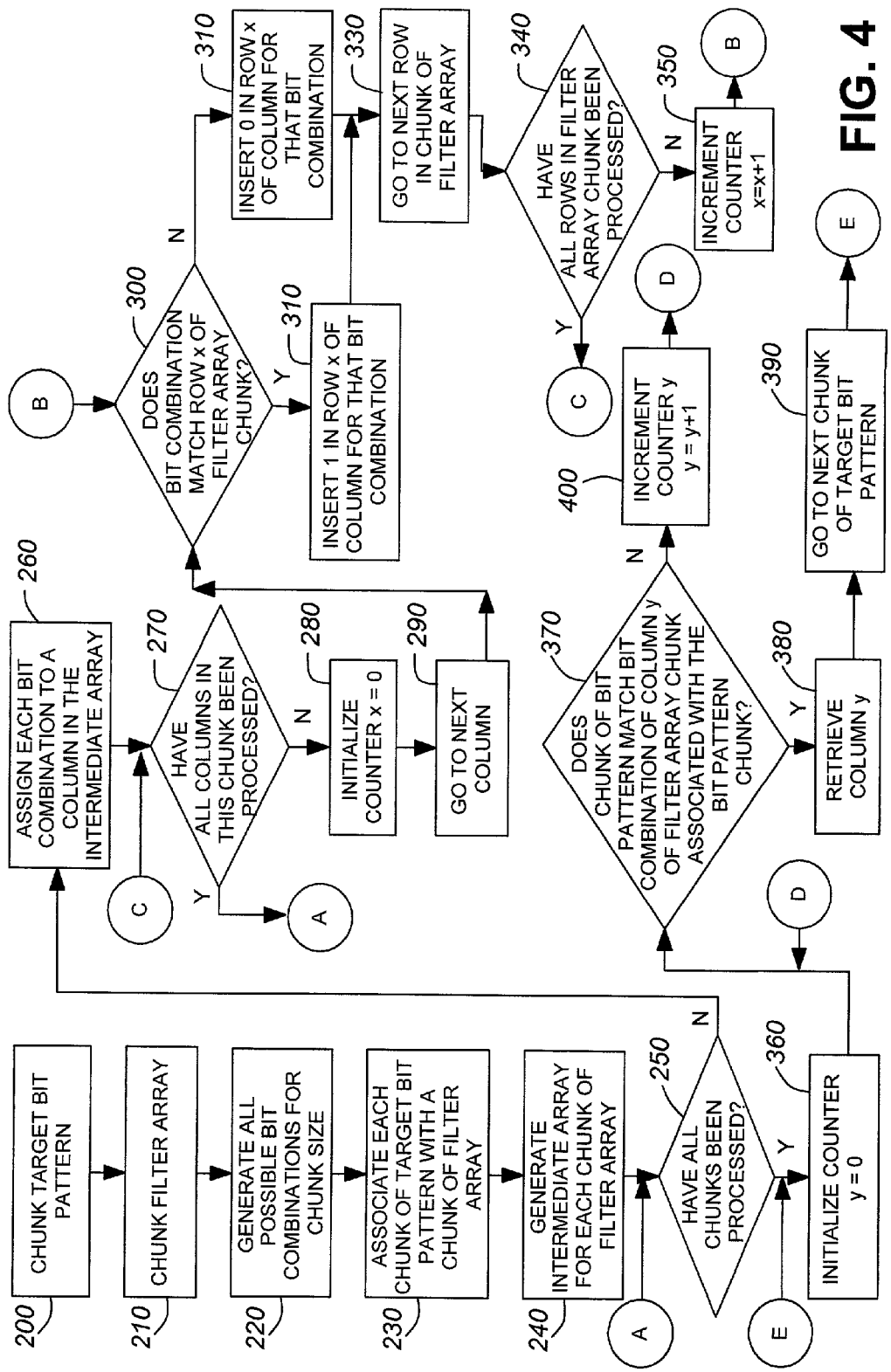
FIG. 4 is a flow chart illustrating the steps in an enhanced masked matching method.

FIG. 4 illustrates a flow chart detailing the steps taken for the enhanced masked matching method in generating the intermediate arrays and in selecting the columns from the intermediate arrays.

As can be seen, the sub process begins with step 200. This step of dividing the target bit pattern into chunks of fixed size (5 bits per chunk with 5 being a predetermined, fixed number) is similar to the next step 210 of dividing ("chunking") the filter array into groups of fixed size (5 bits per group). Chunking the filter array merely involves subdividing the filter array into groups of 5 columns per group.

Step 220 is that of generating all possible bit combinations for 5 bits. Once this is done, each chunk of portion of the target bit pattern is then associated with a filter array chunk (group of 5 columns from the filter array).

Step 240 is then that of generating an intermediate array for each chunk of the filter array. Thus, steps 250–350 are repeated for each chunk or portion of the filter array. This sub group of the process starts with step 250—that of checking whether all the chunks in the filter array have been processed. If not, then step 260 is that of assigning to each column of the intermediate array to be populated one of the bit combinations generated in step 220. Step 270 is then a check as to whether all the columns in the intermediate array has been processed (i.e. is there a bit value for all the elements in the intermediate array). If the answer to step 270 is in the negative, then step 280 is that of initializing a counter to be used for each column. Step 290 is that of actually choosing a column in the intermediate array to be processed or populated. This column chosen will be the column to be populated in steps 300–350.

Step 300 tries to match the bit combination associated with the column to the filter bit values of row x of the filter array chunk associated with the intermediate array being generated. If the bit combination matches the filter bit values of row x, then row x of the column being populated is given a value of 1 (step 310). On the other hand, if the filter bit values do not match the bit combination associated with the column being populated, then row x of this intermediate array column is given a value of 0 (step 320). After either steps 310 or 320, step 330 is that of moving to the next row in the filter array chunk. This is done through steps 340 and 350. Step 340 checks if all the rows in the filter array chunk have been compared to the bit combination. If not, then step 350 is that of incrementing the counter keeping track of the row numbers. Then, connector B shows that program flow moves back to step 300.

If all the rows in the filter array chunk have been accounted for, as evidenced by a positive reply to the query of step 340, then the logic flows to connector C and a revisiting of step 270.

For step 270, once a positive reply has been received, connector A shows that the logic flow moves to a revisiting of step 250.

From the above, it should be clear that steps 300–350 are repeated until all rows in the filter array chunk have been processed. Also, it should be clear that, while steps 300–350 is a sub process, steps 260–350 are repeated for each chunk of the filter array, with sub process steps 300–350 being repeated as many times as necessary.

Once all the intermediate arrays have been generated (steps 260–350), the response to the query of step 250 should be in the positive. Step 360 thus initializes a counter which keeps track of columns being examined.

Step 370 then tries to match a chunk or portion of the target bit pattern with a bit combination associated with a column Y from the intermediate array generated from the filter array chunk associated with that portion of the target bit pattern. If the bit combination of column Y matches the chunk of the target bit pattern, then that column Y is retrieved (step 380). Step 390 then moves to the next chunk of the target bit pattern and, concomitantly, the next chunk of the filter array and the next intermediate array. This moves the flow, as shown by connector E, back to step 360.

On the other hand, if the result of query 370 is negative, then step 400 is that of incrementing the counter Y and thereby moving to the next column of the intermediate array. Since all possible combinations of 5 bits have been generated (step 220) and associated with a column in the intermediate array (step 260), then query 370 will eventually result in a positive response. The logic, after step 400, is thus a return to query 370, as shown by connector D.

In terms of hardware system requirements, EMMM requires a memory size of MS:

$$MS = W/S \cdot 2^S \cdot N$$

The memory bandwidth (number of memory bit access per lookup required by EMMM is MB:

$$MB = W/S \cdot N$$

The computational complexity (number of 2 input AND operations) for EMMM is CC:

$$C = W/S \cdot N$$

In the above formulas, the variables represent he following:

W=width size in bits of the filter bit patterns;
S=chunk size in bits; and
N=number of filter bit patterns.

It should be clear that EMMM has a distinct advantage over known technique in that its operations can be efficiently executed in parallel. For such an implementation, the main factors which need to be considered are the memory bandwidth (MB) and the memory size (MS). It has been found that, for N=16384 and W=128 (i.e. 16K filter bit patterns each being 128 bits wide), the following MS and MB sizes are required, with its attendant speed up effect:

| Speed Up Factor | Memory Size (MS) in bits | Memory Bandwidth (MB) bits per lookup |
| --- | --- | --- |
| 1 | 4M | 2M |
| 2 | 4M | 1M |
| 4 | 8M | 512K |
| 8 | 64M | 256K |

In one implementation, a speedup factor of 4 was deemed desirable as this merely doubles the memory size while reducing the memory bandwidth requirement by a factor of 4.

Figure 5:
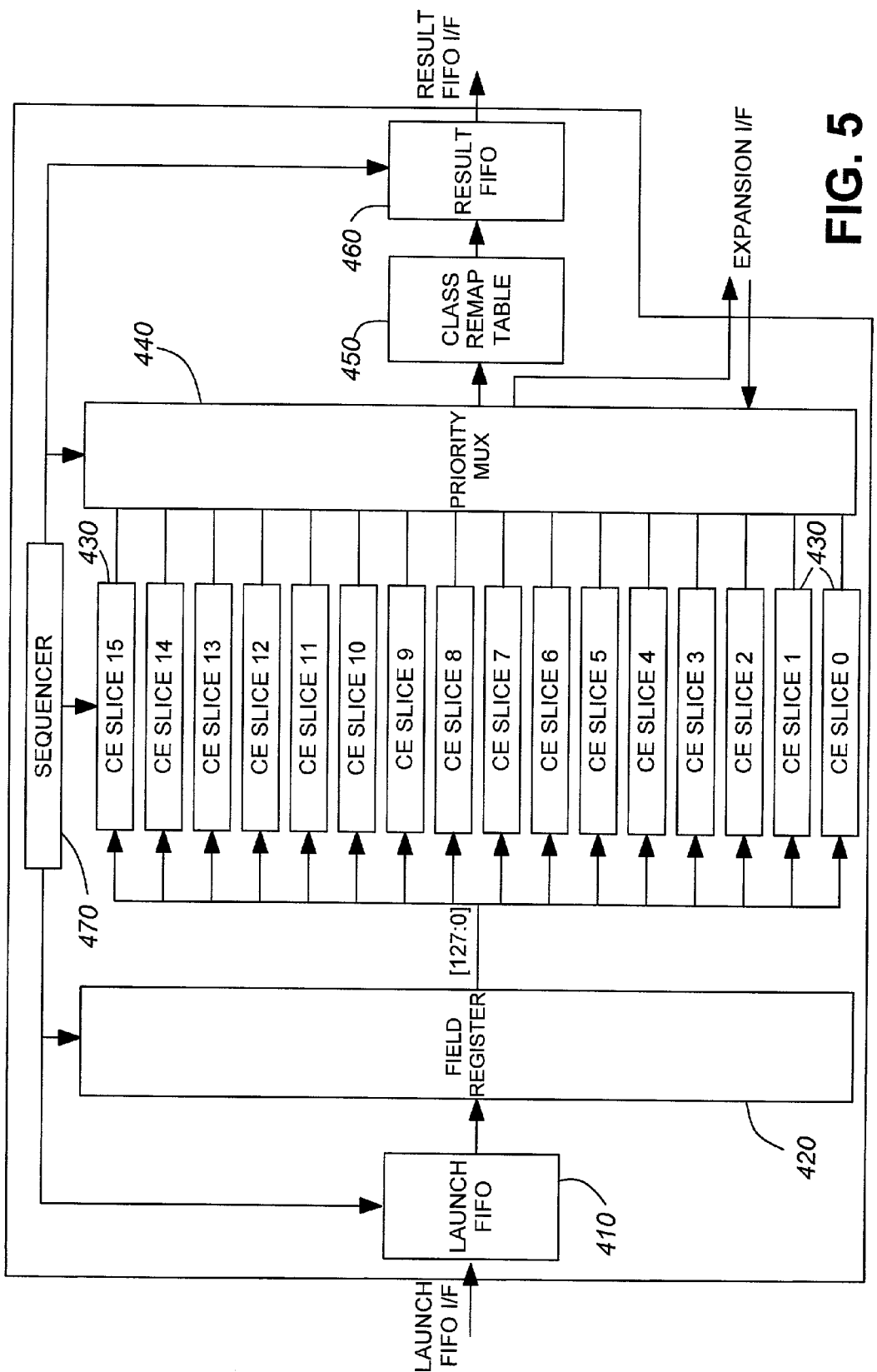
FIG. 5 is a block diagram for a device implementing a masked matching method.

One hardware implementation of the EMMM is illustrated in FIG. 5. This implementation takes advantage of the suitability of the EMMM to parallel processing. A launch FIFO (first-in, first-out) device 410 receives target bit patterns in sequences. This FIFO device 410 then passes these target bit patterns to a field register 420. The field register 420 passes the target bit pattern to multiple classifier elements 430 simultaneously. Each classifier element 430 acts independently of the others and independently tries to match the target bit pattern with multiple filter bit patterns. Thus, if as an example, there are 100 filter bit pattens and 5 classifier elements, each classifier element can handle 20 filter bit patterns. this means that, instead of using a simple classifier to try and match a target bit pattern with 100 filter bit patterns, the computation load (and the processing time) is distributed among 5 classifiers.

After matching (if there is a match) the target bit pattern with the filter bit patterns, the multiple classifier elements 430 pass on their respective results to a priority multiplexer 440. The priority multiplexer 440 then prioritizes among the different results from the classifier elements and determines the final matching filter bit pattern. this final matching filter bit pattern is then sent to a class remap table 450 to determine the logical identifier for the filter bit pattern. As noted above, the class remap table merely enables the physical identifier of a filter bit pattern to be different from its logical identifier. Once the identifier for the final matching filter bit pattern has been determined, this identifier is transmitted to a result FIFO device 460 for eventual re-transmission to other systems as and when required.

The whole system illustrated in FIG. 5 is controlled by a sequencer 470. The sequencer 470 determines when a new target bit pattern is to be released from the launch FIFO device 410 (essentially a buffer) for storage in the field register 420 and processing by the classifier elements 430. the sequencer also determines which step in the process each sequencer is executing. Since all the classifier elements 430 are executing in parallel, the sequencer 470, by providing a common "clock signal" to each classifier element, ensures that all the classifier elements 430 are in step with one another. The role of the sequencer 470 for each classifier element 430 will be further discussed below.

The sequencer 470 also determines when the result FIFO device 460 releases a match result to an outside device or system.

In one specific implementation, 16 classifier elements 430 are used with each classifier element handling 1024 filter bit patterns with each bit pattern having 128 bits. The implementation also utilizes a pipelined priority multiplexer 440. Each classifier element 430 is equipped with 512×1024 bits of RAM. The total memory size for all 16 classifier elements 430 is estimated to be 8 M bits. In terms of performance with the classifier elements 430 implementing EMMM (as will be described below), matching a target bit pattern to at any of 1024 filter bit patterns takes 32 clock cycles to complete. Given this and an OC-48 packet rate of about 6 million packets per second, a clock frequency of 192 MHz (6 million packets per second×32 clock cycles per packet=192 million) would be required to keep up with an OC-48 packet rate.

Figure 6:
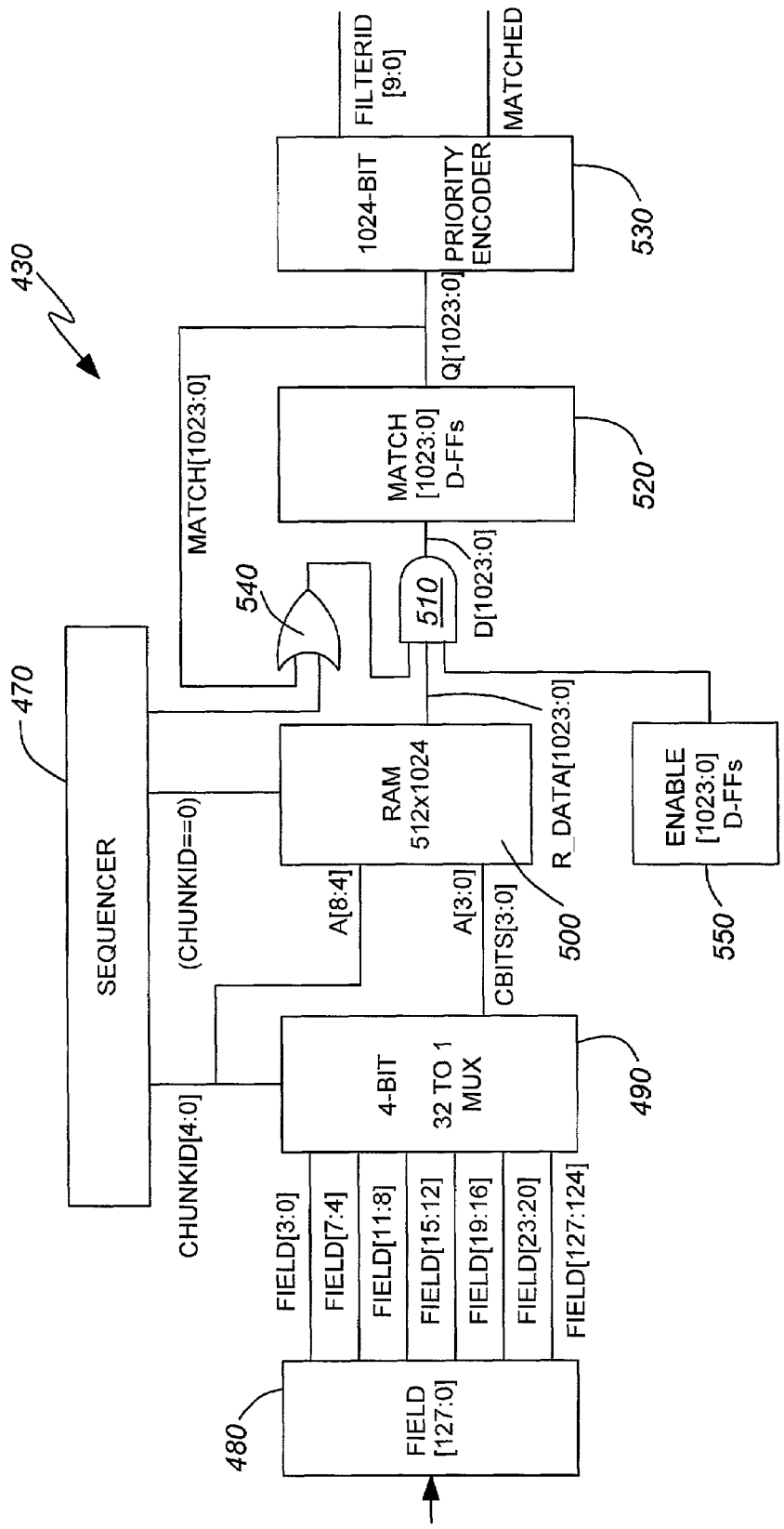
FIG. 6 is a block diagram illustrating the internal components for a classifier element used in the device of FIG. 5.

In one embodiment, each classifier element 430 has an internal structure as illustrated in FIG. 6. It should be noted that while a sequencer 470 is shown in FIG. 6, it is not part of the classifier element 430. It is simply illustrated to clarify its function in relation to each component of the classifier element 430.

As noted above, each classifier element 430 receives the target bit pattern from the field register 420. Within each classifier element 430, this target bit pattern (also referred to as a target filed vector) is received by a target pattern storage device 480. This device 480 divides the target bit pattern into a predetermined number of portions or chunks. Each chunk is a grouped portion of the target bit pattern and each chunk is simultaneously but separately fed to an internal multiplexer 490. The target pattern storage device 480 can be any device which receives a serial bit stream and outputs a bit pattern in parallel based on the bitstream. In the example illustrated, a 128 bit target pattern is envisioned and so, the device 480 can receive 128 bits in series and outputs those 128 bits in parallel using 4 bit groupings or chunks to the multiplexer 490. However, it should be clear that if the output of the field register 420 is a 128 bit parallel output, this output may be sent directly to the internal multiplexer 490, thereby obviating the need for a device 480.

The internal multiplexer 490 chooses one of the chunks from the device 480 based on an input (chunk id) from the sequencer 470. This chosen chunk (cbits) is then output to memory device 500. The input (chunk id) from the sequencer 470 and the output (cbits) of the internal multiplexer 470 then form a memory address of the memory device 500. The contents (R-DATA) of the memory address are then output to an AND gate 510.

At this point it is instructive to correlate the classifier element components with the particular steps in the EMMM. To begin, it should be noted that the memory device 500 contains the elements of the intermediate arrays required by EMMM.

The divided target bit pattern fed into the internal multiplexer 490 corresponds to the target bit pattern with each portion corresponding to a chunked part of the bit pattern.

According to EMMM, each chunk or portion of the target bit pattern is to be matched with a specific intermediate array based on the bit pattern of the chunk and the bit pattern generated and associated with that particular array. This is done by having the internal multiplexer 490 select a chunk of the target bit pattern and to use that selected chunk as part of the memory address to access the memory device 500. The other portion of the memory address used to access the memory device 500 is the signal that identifies to the internal multiplexer 500 the chunk to be selected. As can be seen from FIG. 6, this 5 bit chunk identifier signal is received by both the internal multiplexer 490 and the memory device 500 from the sequencer 470. As noted above, this sequencer 470 is external to the classifier element 430.

Figure 7:
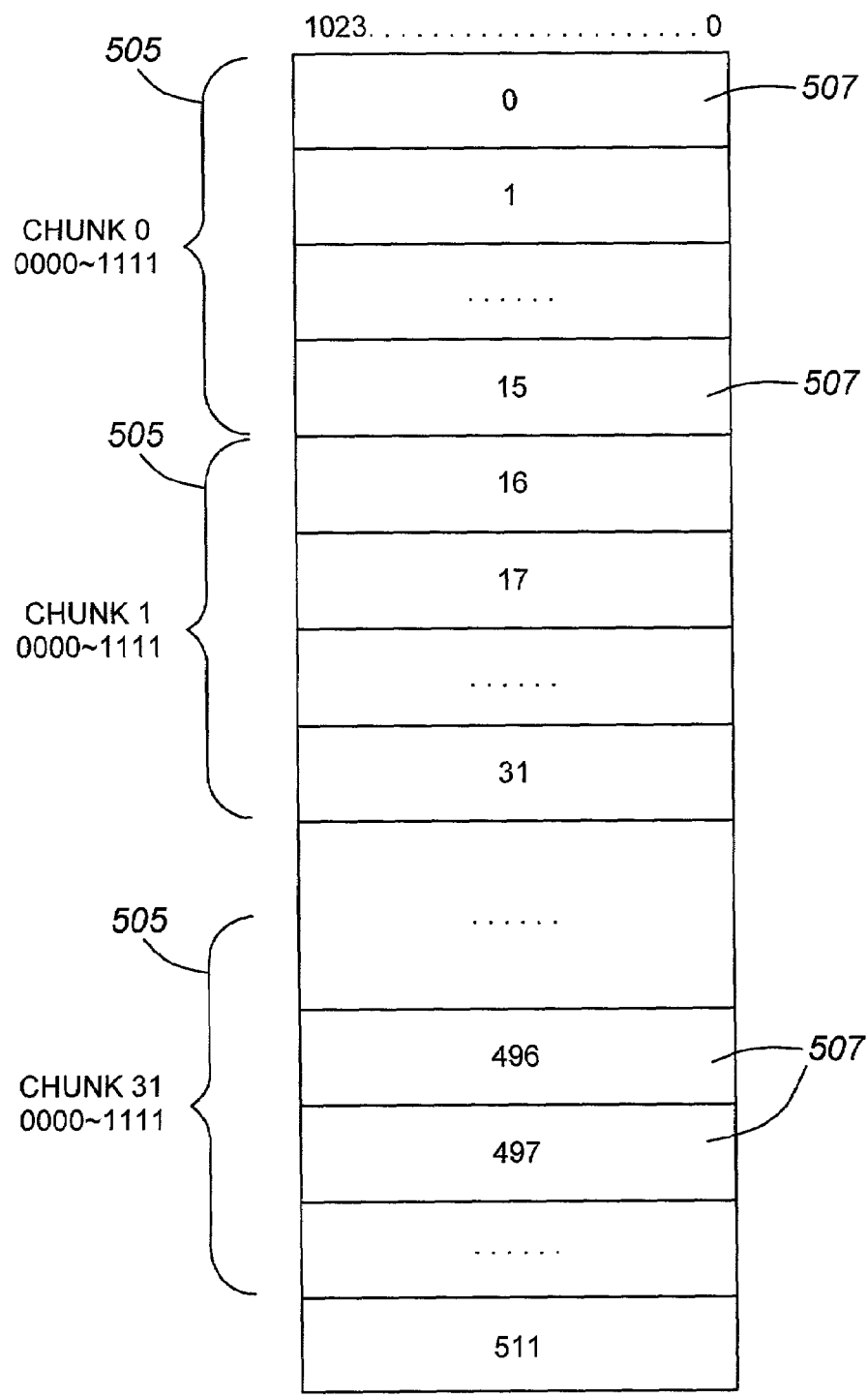
FIG. 7 is a memory map for a memory device used in a classifier element of FIG. 6.

The memory scheme is implemented in the memory device 500 easily lends itself to EMMM. A memory map of the scheme is illustrated in FIG. 7. As can be seen, the memory space is divided into 32 distinct regions 505 with each region corresponding to a specific chunk or portion of the target bit pattern. Within each region are 16 memory slots 507. Each region contains all the rows of the intermediate array that corresponds to the portion of the target bit pattern assigned to that region. Since the example contemplates a 4 bit chunk of the target bit pattern, then, as EMMM dictates, all possible 4 bit combinations must be assigned one of the 4 bit combinations. The 4 bit chunk of the target bit pattern is then matched with the generated 4 bit patterns and the row assigned to that pattern is retrieved. This is implemented in the memory map of FIG. 7 by having each of the 16 slots in a region correspond to a row of the intermediate array for that region. Then, the 4 bit target chunk of the target bit pattern serves as the index by which the relevant slot is found. It should be noted that the relevant region is found using the 5 bit chunk identifier from the sequencer 470 as the first part of the memory address.

As an example, the sequencer 470 could output 0 1 0 1 1 as the chunk identifier. This means that the $13^{th}$ chunk of the 32 chunks of the target bit identifier is to be matched. This is because the binary sequence 0 1 0 1 1 is 13 in decimal value. If the $13^{th}$ 4 bit chunk of the target bit pattern is 0 1 0 1, then the total memory address is the concatenation of the two binary values: [0 1 0 1 1] concatenated with [0 1 0 1] to result in [0 1 0 1 1 0 1 1].

The first part of the total memory address refers to the $13^{th}$ region of the 32 regions in the memory map. The $2^{nd}$ part of the total memory address refers to the $3^{rd}$ slot within that region (since 0 1 0 1—the chunk of the target bit pattern—has a decimal value of 3). Thus, the matching row is contained in the $3^{rd}$ slots of the region.

Once the matching row is found, its contents (1024 bits) is sent to a multibit AND gate 510. This AND gate 510 performs an AND operation between the latest matching row and a running result (stored in a D flip flop 520) from previous AND operations. After the AND operation, the resulting vector is stored in a D flip flop 520 for subsequent AND operations.

Once all the chunks of the target bit pattern have been processed, the resulting vector stored in the D flip flop 520 is sent to a priority encoder 530. The priority encoder 530 determines which of the matching filters, as shown by the vector in the D flip flops, had the highest priority. The filter with the highest priority was then identified and this identity was output the priority encoder 530. Another output of the priority encoder 530 is a matched flag which indicates that, for this specific classifier element, a match was found.

While not critical to the workings of the classifier element, an OR gate 540 and an enable flip flop 550 may also be implemented. The OR gate 540 is placed to enable the AND gate 510 to handle an initial match. If there are no previous AND results, then no results will pass through the AND gate 510. Thus, if the chunk identifier from the external sequencer 470 identifies the target bit pattern chunk being examined as the first chunk (chunk id=0) then a vector with all 1's as its elements is fed into the AND gate 510. The OR gate 540 also handles the previous match vector from the D flip flop 520. As long as the target bit pattern chunk is not the first chunk, then the previous AND results are presented to the AND gate 570.

The enable flip flop 550 enables the filters to be turned on or off as the case may be. If a specific filter is not to be used, its entry in the enable flip flop 550 is set to 0. This way, if this disabled filter is found to be a match to the chunk of the target bit pattern, then its 0 entry in the enable flip flop will prevent its entry through the AND gate 570. This is because, as shown in FIG. 6, the AND gate 510 receives not only the output of the memory device 500 but also the outputs of the OR gate 540 and of the enable flip flop 550.

It should be clear from the above that the memory device 500 in at least some of the classifier elements 430 needs to be populated with the intermediate array entries before the whole system can work.

Figure 8:
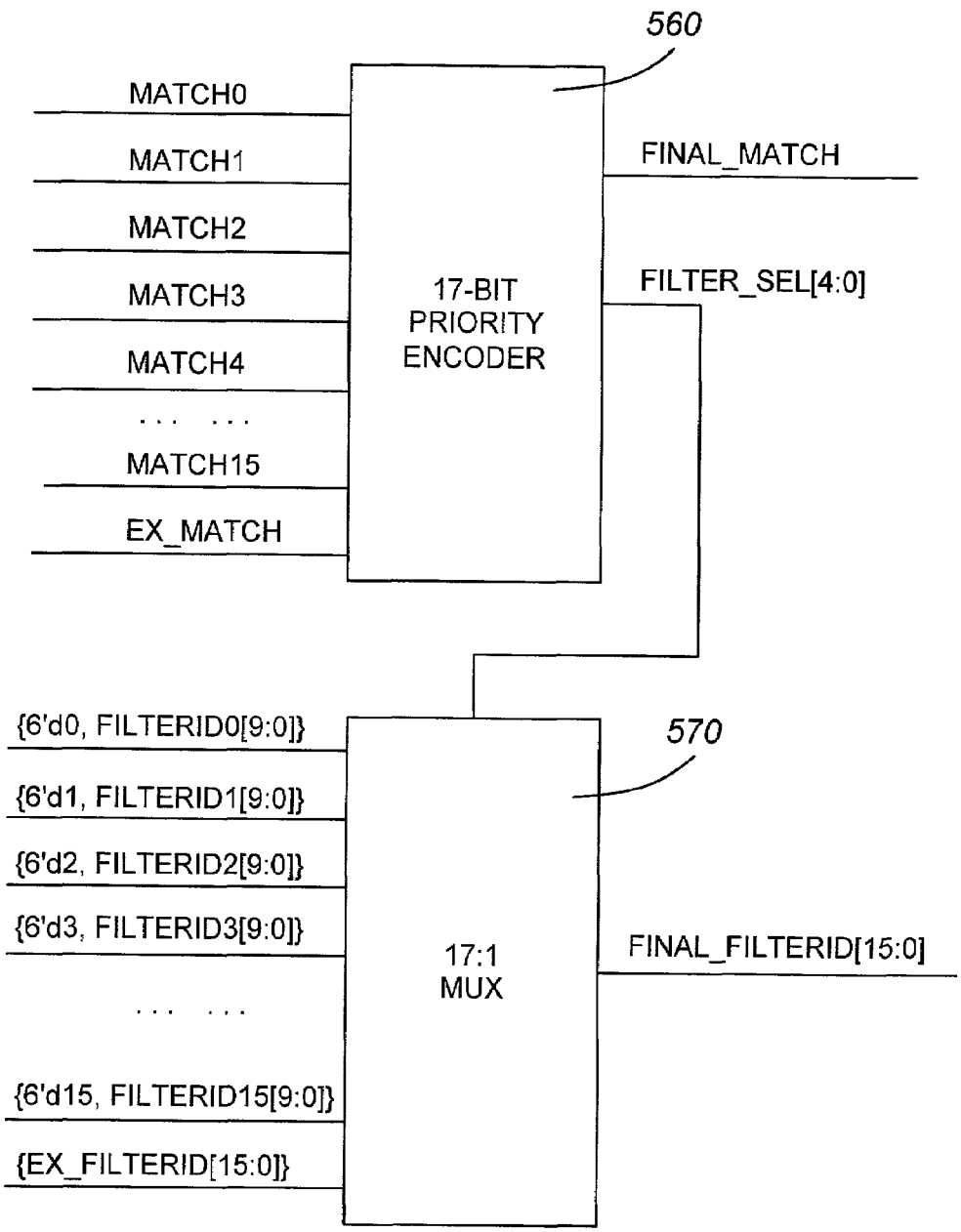
FIG. 8 is a block diagram of the internal components of the priority multiplexer used in the device of FIG. 5.

Returning to FIG. 5, the priority multiplexer 440 receives the matching filter identifiers from the multiple classifier elements 430. The internal structure of the priority multiplexer 440 is illustrated in FIG. 8. The match flags are received by a 17 bit priority encoder 560 internal to the priority multiplexer 440. The filter identifiers are received by a 17:1 multiplexer 570. The priority encoder 560 then chooses the classifier element having a match and with the highest priority and, based on this, generates a 5 bit word which it sends to the 17:1 multiplexer 570. The priority encoder 560 also outputs a flag (final-match) which initiates that a final match has been found. The 17:1 multiplexer 570 receives the 5 bit word and based on its value, selects one of the filter identifiers from the matching classifier element and outputs this identifier as the final matching filter identifier.

As an example, if classifier elements 1, 5, 8, 13, and 15 have found matching filters, then matching flags are sent to the priority encoder 560. If, among these classifier elements, classifier element 8 has the highest priority, then the 5 bit word sent to the multiplexer 570 would be 0 1 0 0 0 as this binary word has a decimal value of 8. When this word is received by the multiplexer 570, the filter identifier from classifier element 8 is then allowed to pass through the multiplexer 570 to become the final filter identifier.

While the above design uses specific parameters other differing parameters can be used. Different chunk sizes can be used with an attendant effect on speed up. The chunk size can be any integer number.

While it is preferable that the chunk size be a factor of the filter width, the chunk size need not necessarily be such a factor. The filter width can be increased to the nearest number which is a multiple of the chosen chunk size. If this is done, the extra bits in the expanded filter and in the target bit pattern are set to zero.

Regarding the memory device, while the design above uses wide RAM devices, narrow RAM devices can also be used. Multiple narrow RAM device can be used in parallel to emulate a wider RAM device.

It should be noted that while the method above contemplates a packet classification process, multiple other applications are possible. Essentially, any application requiring that a match be found between a specific bit pattern and multiple filter bit patterns can use the above method and apparatus. Specifically, all applications using TCAMs (Ternary Content Addressable Memory) can utilize the above method. Furthermore, other applications such as:
  a) acceleration of database query processing;
  b) bit pattern search in a large file;
  c) firewall device scanning of virus pattern signatures on network traffic or email files; and
  d) network intrusion detection systems where suspicious traffic is scanned for bit patterns in a high speed network connection can use the above method and apparatus.

To customize the above method and apparatus, the target bit pattern is the pattern needing a match. The rules bit patterns can be obtained by dividing a bit stream, if that is the format of the incoming data, into set segments. Or, if the data set to be searched is a file or a large data set, the data set can be divided into specific length segments corresponding to the filter bit pattern length.

A person understanding the above-described invention may now conceive of alternative designs, using the principles described herein. All such designs which fall within the scope of the claims appended hereto are considered to be part of the present invention.

I claim:

1. In a packet classification process, a method of determining whether a target bit pattern matches at least one of a plurality of filter bit patterns, each bit pattern being composed of a specific sequence of element bits, each element bit in said target bit pattern having a value of either 1 or 0 and each element bit in said filter bit pattern having a value of 1, 0, or x where x can be matched by any value of an element bit the method comprising:
    a) generating a target vector from said target bit pattern;
    b) generating a filter array from said plurality of filter bit patterns, each filter bit pattern corresponding to a row in said filter array;
    c) generating at least one intermediate array based on said filter array;
    d) selecting specific columns from said at least one intermediate array based on bit values of said target vector;
    e) generating a final array from columns selected in step d); and
    f) generating a match vector from said final array, each vector element of said match vector being a result of a bitwise AND operation on a row of said final array,
wherein each vector element in said match vector having a value of 1 indicates a match between said target bit pattern and a filter bit pattern corresponding to a row in said filter array having the same row number as said vector element.

2. A method as in claim 1 further including dividing said target vector into a plurality of sub groups, each subgroup having y elements.

3. A method as in claim 2 wherein said filter array is divided into sub arrays, each sub array having y columns.

4. A method as in claim 3 wherein step c) generates multiple intermediate arrays, each intermediate array corresponding to a specific sub array and to a specific sub group of said target vector.

5. A method as in claim 4 wherein each intermediate array has 2 y columns and a number of rows equal to the number of filter bit patterns.

6. A method as in claim 5 wherein for each column in each group of columns as defined by an intermediate array, an intermediate bit sequence of y bits is generated, said intermediate bit sequence being unique to said column in said group of columns.

7. A method as in claim 6, wherein each intermediate array I is generated by:
    for each intermediate array element in column c and row r in said intermediate array, determining if there is a match between an intermediate bit sequence for column c and row r of a sub array corresponding to said intermediate array I, such that if there is a match then said intermediate array element in column c and row r given a value of 1 AND
    if there is no match then said intermediate array element in column c and row r is given a value of 0.

8. A method as in claim 7 wherein step d) is accomplished by:
    for each intermediate array I comparing each intermediate bit sequence for each column with the specific subgroup of said target vector associated with said intermediate array I, AND
    when a matching intermediate bit sequence matches said subgroup, selecting a column associated with said matching intermediate bit sequence.

9. A method as in claim 8 wherein step e) is accomplished by retrieving intermediate array columns selected in step d) and generating the final array such that each intermediate array column selected in step d) is a column in said final array.

10. A method as in claim 1, wherein a P intermediate array is generated by:
    for each P intermediate array element in column c row r, determining a value of filter array element in column c row r of said filter array AND
    assigning a value to said P intermediate array element according to the table:

| Filter Array Element Value | P Intermediate Array Element Value |
|---|---|
| 0 | 0 |
| 1 | 1 |
| x | 1. |

11. A method as in claim 10 wherein a Q intermediate array is generated by:
    for each Q intermediate array element in column c row r, determining a value of filter array element in column c row r of said filter array AND
    assigning a value to said Q intermediate army element according to the table:

| Filter Array Element Value | P Intermediate Array Element Value |
|---|---|
| 0 | 1 |
| 1 | 0 |
| x | 1. |

12. A method as in claim 11 where in step d) is accomplished by:
    for each element bit in position p of said target vector, determining a value of said element bit of said target vector and
    if said element bit has a value of 1, selecting column p of said P intermediate array or
    if said element bit has a value of 0, selecting column P of said Q intermediate array.

13. A method as in claim 12 wherein step e) is accomplished by retrieving intermediate array columns selected in step d) and generating the final array such that each intermediate array column selected in step d) is a column in said final array.

14. A system for matching a target bit pattern with a plurality of filter bit patterns, said a system comprising:
    a field register containing said target bit sequence;
    a plurality of classifier elements, each classifier element being associated with a group of filter bit patterns, each classifier element receiving said target bit pattern from said field register, and each classifier element outputting a filter identifier identifying which filter bit pattern from the group of filter bit patterns associated with said classifier element matches said target bit pattern, each classifier element comprising:

an input stage receiving said target bit pattern and having a plurality of stage outputs, each stage output being a portion of said target bit pattern a multiplexer stage receiving said stage outputs, said multiplexer stage selecting one of said stage outputs as a multiplexer output based on a sequencer output;

a memory stage unit receiving said multiplexer output and said sequencer output, said storage unit having a storage unit output determined by said multiplexer output and said sequencer output, said memory stage unit storing intermediate arrays generated from said filter bit patterns;

AND gate means for performing an AND operation between successive storage unit outputs and a match vector to produce a new match vector, said match vector indicating which filter bit pattern matches said target bit pattern; and match vector storage means for storing said match vector, said match vector storage means receiving said new match vector to overwrite an old match vector, said match vector storage means outputting said match vector a priority multiplexer receiving outputs from said classifier elements said priority multiplexer determining which of said outputs of said classifier elements has a highest priority;

a launch first in-first out (FIFO) buffer receiving a sequence of target bit patterns and transmitting in sequence said target bit patterns to said field register;

a result first in-first out (FIFO) buffer receiving an output of said multiplexer and transmitting in sequence saids, previous cutouts of said multiplexer; and a sequencer communicating with each classifier element, said multiplexer, said field register, and each of said buffers, said sequencer determining which target bit pattern is being matched.

15. A system as in claim 14 wherein each classifier element includes a priority encoder, said priority encoder receiving said match vector from said match vector storage means, said priority encoder determining which of said fitter bit patterns a identified by said match vector as matching said target bit pattern has a highest priority and said priority encoder outputting a filter identifier identifying a matching filter bit pattern with the highest priority.

16. A classifier element for matching a target bit pattern with a plurality of filter bit patterns, the classifier element comprising:

an input stage receiving said target bit pattern and having a plurality of stage outputs, each stage output being a portion of said target bit pattern;

a multiplexer stage receiving said stage outputs, said multiplexer stage selecting one of said stage outputs as a multiplexer output based on a sequencer output;

a memory stage unit receiving said multiplexer output and said sequencer output, said storage unit having a storage unit output determined by said multiplexer output and said sequencer output, said memory stage unit storing intermediate arrays generated from said filter bit patterns;

gate means for performing an AND operation between successive storage unit outputs and a match vector to produce a new match vector, said match vector indicating which filter bit pattern matches said target bit pattern; and match vector storage means for storing said match vector, said match vector storage means receiving said new match vector to overwrite an old match vector, said match vector storage means outputting said match vector.

17. A classifier element as in claim 16 further including a priority encoder, said priority encoder receiving said match vector from said match vector storage means, said priority encoder determining which of said filter bit patterns identified by said match vector as matching said target bit pattern has a highest priority and said priority encoder outputting a filter identifier identifying a matching filter bit pattern with the highest priority.

18. A system as in claim 14 wherein each classifier element includes an enable bank, said enable bank determining which of said intermediate arrays are active in said memory storage unit, an output of said enable bank being received by said gate means such that if an intermediate array both inactive and is output by said memory storage unit, said gate means outputs said old match vector as the new match vector.

19. A classifier element as in claim 16 wherein each classifier element includes an enable bank, said enable bank determining which of said intermediate arrays are active in said memory storage unit, an output of said enable bank being received by said gate means such that if an intermediate array both inactive and is output by said memory storage unit, said gate means outputs said old match vector as the new match vector.

20. A method of determining whether a target bit pattern matches at least one of a plurality of filter bit patters, each bit pattern being composed of a specific sequence of element bits, each element bit in said target bit pattern having a value of either 1 or 0 and each element bit in said filter bit pattern having a value of 1, 0, or x where x can be matched by any value of an element bit, the method comprising:

a) generating a target vector from said target bit patted;

b) generating a filter array from said plurality of filter bit patterns, each filter bit pattern corresponding to a row in said filter array;

c) generating at least one intermediate array based on said filter array;

d) selecting specific columns from said at least one intermediate array based on bit values of said target vector;

e) generating a final array from columns selected in step d); and f) generating a match vector from said final array, each vector element of said match vector being a result of a bitwise AND operation on a row of said final array, wherein each vector element in said match vector having a value of 1 indicates a match between said target bit pattern and a filter bit pattern corresponding to a row in said filter array having the same row number as said vector element.

* * * * *